Patented June 19, 1934

1,963,084

UNITED STATES PATENT OFFICE 1,963,084

SULPHUR TERPENE COMPOUNDS AND PROCESS OF PRODUCING THE SAME

Henry A. Gardner, Washington, D. C., and Leland P. Hart, Clarendon, Va., assignors to Henry A. Gardner Laboratory, Inc., Washington, D. C., a corporation of the District of Columbia No Drawing. Application December 2, 1931, Serial No. 578,610

4 Claims. (Cl. 260—17)

This invention relates to the preparation of compounds by reacting sulphur with a terpene under conditions hereinafter specified. The invention relates also to the products so prepared.

We have found that a combination of sulphur and a terpene, such for instance as turpentine, pine oil, or a similar terpene, when processed in the presence or absence of an oxygen compound of lead such as for example litharge or lead hydrate, or of other oxygen compounds of other heavy metals, at a temperature of from about 120° to about 130° C. for a period of time approximating 12 hours, yields products having interesting properties being characterized chiefly by their ability to accelerate the vulcanization of rubber by the heat and pressure method.

Illustrative of the process by which the said products are prepared is the following:

Example I 1000 grams of turpentine is heated to a temperature of 120° C. 150 grams of elemental sulphur is wetted by thorough admixture with a small but sufficient quantity (say, 100 grams) of the so heated turpentine to form a stiff paste. This paste of sulphur and turpentine is slowly added, by small portions, to the main body of turpentine maintained at about 120° C., with constant agitation, the addition being protected over about one hour. The resulting mixture is then heated under reflux, with stirring, for a period of about twelve hours, the temperature being maintained at from about 120° C. to about 130° C. At the end of this period the product is a clear red-brown liquid which constitutes an embodiment of the present invention. Blowing air or other gas through the mixture appears to expedite the reaction.

During initial stages of the reaction between sulphur and turpentine a drop or two of the mixture when removed from the main body thereof and cooled shows a milky precipitate of sulphur; as the reaction progresses this milky precipitate becomes less and less pronounced and finally disappears. A sample of the final product may be diluted with from 3 to 4 volumes of acetone without any precipitation of sulphur, this test being indicative of the completion of the reaction between the sulphur and the turpentine by reason of the fact that addition of acetone to a simple solution of sulphur and turpentine precipitates the sulphur.

The proportions of the two reactants may be varied to some extent without apparent change in the general character of the process or of the product. Thus, we have found that the amount of sulphur used in the foregoing example may be increased to 300 or 320 grams of sulphur without a critical difference in the product. Also, we have found that another terpene, such for instance, as pine oil, abietic acid, dipentene, or mixtures thereof, or mixtures of any of these compounds with turpentine, may be substituted for the turpentine.

The aforesaid liquid product shows a high content of non-volatile matter. This is evidenced in the following: After reacting 1000 grams of turpentine with 300 grams of sulphur at a temperature of from 120° C. to 130° C. for a period of eight hours we found, by application of the aforesaid acetone test, that the product at that stage still contained sulphur as such. The non-volatile content of this intermediate product was only 25% (three to four hours at 105° C.). We further processed this intermediate product until the acetone test showed no precipitation of sulphur, or for about fourteen hours more. The non-volatile content (three to four hours at 105° C.) thereby had been increased to 76%. The turpentine used is almost completely evaporated (less than 1% solids) when exposed alone for two hours or thereabout at 105° C. The completely reacted sulphur-turpentine product from 1000 grams of turpentine and 150 grams of sulphur shows, by the above test, a non-volatile content of 48%. Careful determination has established that there is no measurable loss in weight between the final product and the starting materials. This non-volatile material is a gummy or viscous mass of about the consistency of molasses; is clear and has a dark red color. The volatile material apparently consists largely or wholly of turpentine. The whole reaction product shows a specific gravity slightly less than that of water, i. e., a specific gravity of about .98.

The chemical constitution of this sulphur-terpene product we are not now able to give, but from the available data we believe that the product consists essentially of one or more organo-sulphur derivatives of the terpene employed. The reaction, carried out as above described, evolves substantially no hydrogen sulphide: while traces of hydrogen sulphide have been observed by the use of acetate paper, they were traces only, and the final product contains practically all of the sulphur originally added. This absence of evolution of hydrogen sulphide is considered to be important, due to the physical changes which occur in sulphur when held at the critical temperature at which rhombic sulphur is converted to the monoclinic form: during this period of suspended transformation the sulphur apparently becomes available as an addition or substitution product in the liquid in which it apparently dissolves.

The sulphur-terpene product of the foregoing example has been found to be adapted for use in the vulcanization of rubber. While it shows a substantial accelerating effect in the vulcanization of a rubber mix containing rubber, sulphur, zinc oxide or other known rubber pigment, and a possible content of stearic acid, its acceleration effects are more pronounced and remarkable when used in conjunction with other known rubber vulcanization accelerators including mercapto-benzo-thiazol, diphenyl guanidine, hexamethylene-tetramine, litharge and the like.

Our researches appear to establish that the sulphur-terpene product above described may, with remarkable results, be admixed with an organic, or with an inorganic, accelerator of rubber vulcanization whereby to provide agents having a double accelerating effect.

Example II

A rubber mix is prepared containing 300 grams of smoked sheet rubber, 363 grams of zinc oxide, 9 grams of sulphur, 3 grams of stearic acid, and 2.4 grams of mercapto-benzo-thiazol. This formula gives an optimum cure in sixty minutes, with a tensile strength of 2900 pounds.

In such a formula we substitute 7.2 grams of the sulphur-terpene product of Example I for the 2.4 grams of mercapto-benzo-thiazol. This formula gives an optimum cure in forty-five minutes, with a tensile strength of about 2560 pounds.

When, however, we use, as the accelerator in the above formula, 7.2 grams of the sulphur-terpene product of Example I together with 1.2 grams of mercapto-benzo-thiazol, instead of the 2.4 grams of mercapto-benzo-thiazol called for therein, the mix gives an optimum cure in forty-five minutes, with a tensile strength of 3640 pounds. This increase of about 20% in tensile strength indicates the possibility of a very attractive economy in rubber manufacture, inasmuch as our product hereinbefore described is markedly less expensive than mercapto-benzo-thiazol, the mixture of 1.2 grams of the latter with 7.2 grams of our product being less expensive than the 2.4 grams of mercapto-benzo-thiazol of the above original formula. Furthermore, a novel double acceleration effect is obtained thereby, since neither the mercapto-benzo-thiazol nor the above-described sulphur-terpene product gives nearly as good results alone as when used together.

Substitution in the last-described formula of 7.2 grams of a sulphur-turpentine product containing 30% (rather than 15%) of sulphur for the 7.2 grams of sulphur-turpentine product there used shows an optimum cure in about thirty-five minutes, with a tensile strength of about 2600 pounds.

We have found further that products having interesting properties may be produced by reacting the sulphur with the terpene in the presence of oxygen compounds of certain heavy metals such as lead; particularly in the presence of litharge or lead hydrate.

Example III 100 grams of litharge are heated with 100 grams of turpentine and 16 grams of sulphur at about 120° C., for a period of time approximating 14 hours, with agitation. Soon after the reaction is initiated the litharge begins to turn black. At the conclusion of the period of heating no sulphur as such can be separated from the reaction mixture. This latter, upon standing, is seen to consist of a black precipitate with a supernatant layer of clear brownish liquid in which is found sulphur-terpene product of Example I. This liquid is decanted and the black precipitate is washed three or four times with acetone to remove any adherent liquid. Analysis of the washed precipitate has, in one instance, shown:

Lead oxide_____ about 53.8%
Lead sulphide_____ "    39.6%
Organic matter_____ "     6.6%

The proportions of the oxygen-metal constituent with respect to those of the sulphur and the terpene may apparently be varied to some extent without critical differences in the resulting lead-sulphur-terpene product.

The entire reaction mixture of Example III, that is to say, the mixture of black precipitate and brownish liquid, possesses novel accelerating effects. Similar effects are obtained where the litharge, or other oxygen compound of lead, is thoroughly admixed with the pre-formed sulphur-terpene compound. We may, if desired, stiffen or "dry" the reaction mixture, or the mixture of litharge and pre-formed sulphur-terpene compound, by admixture therewith of a drying filler such as diatomaceous earth; say, an amount by weight of the latter equivalent to about one-half the weight of the said reaction mixture. Or, we may stiffen the mass by an addition of aluminum stearate or similar material productive of a gel structure.

Example IV

Illustrative of the effectiveness of the reaction mixture of Example III in acceleration of rubber vulcanization is the following: A rubber mix is prepared from 300 grams of rubber, 363 grams of zinc oxide, 9 grams of sulphur, 3 grams of stearic acid, 1.2 grams of mercapto-benzo-thiazol and 22 grams of the reaction mixture of Example III. This mix shows an optimum cure in fifteen minutes, with a tensile strength of about 3400 pounds. Similar effects appear to be procurable by the use, with the sulphur-terpene product, of other inorganic accelerators including, for example, calcined magnesium oxide.

It should also be noted here that our sulphur-terpene compound, either in the presence or absence of an oxygen compound of lead, mixes with rubber very readily and easily, having a high solvent action on the rubber. Of these characteristics we may take advantage by adding to a body of the sulphur-terpene product, with or without litharge, about 10% of its weight of rubber. The rubber gradually dissolves and produces a stiff mass of clear, gelatinous, rubber solution which is easy to handle.

It is to be understood that the sulphur-terpene compound of the present invention need not be associated with zinc oxide, but may with similarly good effects be associated with other pigments commonly used in rubber compounding, including carbon block, kaolin, and the like.

While we cannot ascribe to the sulphur-terpene product of the present invention definite functions in the vulcanization of rubber it appears probable that the said compound serves to make available to the rubber mass sufficient sulphur in a readily available form to effect vulcanization, and that by the use of the said compound vulcanization may be effected at a temperature below the melting point of elemental sulphur.

It appears probable that by the use of this sulphur-terpene product, with theoretically correct proportions of added elemental sulphur, rubber may be vulcanized under most advantageous conditions producing a non-blooming stock.

We claim:

1. The product, a terpene derivative containing sulphur in a form non-precipitable by means of acetone, said product having a reddish-brown color, a penetrating odor, and an accelerating effect in the vulcanization of rubber, said product being further characterized in that it is produced by heating sulphur with a terpene at a temperature of about 120°–130° C. for a period of time approximating 12 hours.

2. The product, a turpentine derivative containing sulphur in a form non-precipitable by means of acetone, said product having a reddish-brown color, a penetrating odor, and an accelerating effect in the vulcanization of rubber, said product being further characterized in that it is produced by heating sulphur with turpentine at a temperature of about 120°–130° C. for a period of time approximating 12 hours.

3. Process which comprises heating a mixture of sulphur and a terpene, with agitation, at a temperature of from about 120° C. to about 130° C. for a period of about 12 hours.

4. Process which comprises heating a mixture of sulphur and turpentine, with agitation, at a temperature of from about 120° C. to about 130° C. for a period of about 12 hours.

HENRY A. GARDNER.
LELAND P. HART.